United States Patent
Huckins

(10) Patent No.: US 7,289,518 B2
(45) Date of Patent: Oct. 30, 2007

(54) METHOD AND APPARATUS FOR REDUCING POWER CONSUMPTION IN A WIRELESS NETWORK STATION

(75) Inventor: Jeffrey L. Huckins, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 1035 days.

(21) Appl. No.: 10/323,111

(22) Filed: Dec. 18, 2002

(65) Prior Publication Data

US 2004/0120279 A1   Jun. 24, 2004

(51) Int. Cl.
*H04L 12/28* (2006.01)

(52) U.S. Cl. .................................. 370/395.54
(58) Field of Classification Search ................ 370/310, 370/312, 390, 400, 401, 328, 349, 351, 474, 370/475; 709/223
See application file for complete search history.

(56) References Cited

U.S. PATENT DOCUMENTS

| | | | | |
|---|---|---|---|---|
| 6,067,297 A | * | 5/2000 | Beach | 370/389 |
| 6,480,508 B1 | * | 11/2002 | Mwikalo et al. | 370/475 |
| 6,771,666 B2 | * | 8/2004 | Barker, Jr. | 370/475 |
| 6,937,602 B2 | * | 8/2005 | Whitehill et al. | 370/395.54 |
| 6,982,982 B1 | * | 1/2006 | Barker et al. | 370/395.54 |
| 7,072,323 B2 | * | 7/2006 | Roberts et al. | 370/338 |
| 7,088,727 B1 | * | 8/2006 | Short et al. | 370/401 |
| 7,126,945 B2 | * | 10/2006 | Beach | 370/389 |
| 7,133,374 B2 | * | 11/2006 | Lo et al. | 370/318 |

OTHER PUBLICATIONS

U.S. Appl. No. 10/101,042, filed Mar. 19, 2002, Huckins, Jeffrey et al.
Peterson, Larry L. et al., Computer Networks A Systems Approach, 2,000, 2nd Edition, pp. 136-142, 268-270, 304-308, Morgan Kaufmann Publishers, San Francisco, CA.

* cited by examiner

*Primary Examiner*—Dmitry Levitan
(74) *Attorney, Agent, or Firm*—Blakely, Sokoloff, Taylor & Zafman LLP

(57) ABSTRACT

A wireless access point is to respond to a request for resolving an upper layer network communications protocol address of a target station, by sending a lower layer network communications protocol address stored in the access point and that is associated with the target station.

19 Claims, 3 Drawing Sheets

METHOD AND APPARATUS FOR REDUCING POWER CONSUMPTION IN A WIRELESS NETWORK STATION

BACKGROUND

This invention relates generally to wireless network communications and in particular to techniques for reducing power consumption in a wireless network station.

In a wireless data communication network, a node can communicate with another node, in the same network or in another network, without being wired to that node for purposes of data communication. This is accomplished by providing the node with a wireless network station. There are at least two types of nodes in a wireless network: a host (also referred to as an end node) and a hub. When a node acts as a host, it originates a transaction with another host. When a node acts as hub, it relays transactions between hosts. A host can be embodied in a mobile computer (sometimes referred to as a laptop or notebook computer) or a portable hand-held computing device such as a personal digital assistant. In such a node, the station may be a wireless network interface controller (WNIC) that communicates, via unguided electromagnetic waves, with the hub. The hub of a wireless network also has a station, though in that case the station needs to be capable of communicating with multiple other stations of the network that wirelessly connect to it. The hub acts as a distribution center for the wireless network, relaying incoming information to a destination node and relaying outgoing information from a source node.

Network nodes communicate with each other via frames (or packets) of information. A packet is routed from its source node to its destination node, and can traverse or be relayed by multiple, intermediate nodes before arriving at its destination. To deliver a packet that has originated in one network and is directed to a destination node in another network, two types of addresses are needed: (1) an upper layer address of the destination node, which may include the address of the particular network in which the destination node resides, and (2) a lower layer address of the destination node, which may include the so-called "physical" address of the destination node in that network. This layering of a network communications protocol is done because of practical difficulties that would otherwise arise for routing packets among billions of nodes, in thousands of networks around the world, if each node were to only be identified by a unique physical address.

The hub of a wireless network "knows" the lower layer addresses of all of the nodes in its network. This allows the hub to relay an incoming packet, which bears the physical address of a destination node, to that destination node. An example of a hub is an access point. The access point also allows its end nodes, which are connected to it wirelessly, to access external networks. The connection between the access point and the external networks is typically via a high speed or broadband wired link (e.g. metal wire or optical fiber), whose bandwidth is currently much greater than that of a typical wireless local area network (WLAN).

Due to practical considerations for dealing with the complexity of a large number of interconnected nodes and WLANs, although the upper layer address of a target node may be readily available to nodes outside of its WLAN, its lower layer address is generally not. However, a protocol known as the Address Resolution Protocol (ARP) has been defined for allowing a source node to obtain the lower layer address of a target destination node. With ARP, the source node broadcasts a request that identifies an upper layer address to be resolved. After being received by an access point, the request is re-broadcast in the WLAN of the access point. In this way, all nodes, including those that are connected by a wireless network, receive the ARP request. Since a node has knowledge of both its lower and upper layer addresses, the node whose upper layer address matches that of the target address specified in the ARP request responds to the request, with its lower layer address.

Nodes that are part of a wireless network may be particularly sensitive to power consumption. For instance, mobile computers and personal digital assistants are battery powered. Accordingly, there is a continuing need to ensure that such devices do not waste battery energy.

BRIEF DESCRIPTION OF THE DRAWINGS

The invention is illustrated by way of example and not by way of limitation in the figures of the accompanying drawings in which like references indicate similar elements. It should be noted that references to "an" embodiment of the invention in this disclosure are not necessarily to the same embodiment, and they mean at least one.

DETAILED DESCRIPTION

According to an embodiment of the invention, a wireless access point is configured to respond to a request or query from a requesting station (that is part of a source node) for resolving a target upper layer network communications protocol address of a target station. The query is for a lower layer network communications protocol address that is associated with the target upper layer address. The target station (which may be part of a target node) is wirelessly connected to the access point, for example as part of a WLAN node. The access point responds by sending a lower layer address that is stored in the access point and that is associated with the target station. This is done so that there is no need to forward the request to the target station, e.g. no need to re-broadcast the request.

By configuring the access point to intercept the request, the target station and/or the target node, which may be in a standby state or in some other low power consumption state, need not consume power in receiving, processing, and transmitting a reply to the request, thereby conserving energy at the target station. At the same time, the target node remains reachable to source nodes that wish to communicate with it, because the access point responds with the correct lower layer address. To accomplish this, the access point has to have knowledge of what the upper and lower layer addresses of the target station are, and has to be configured to intercept requests from requesting stations that want to resolve an upper layer address of the target station.

Figure 1:
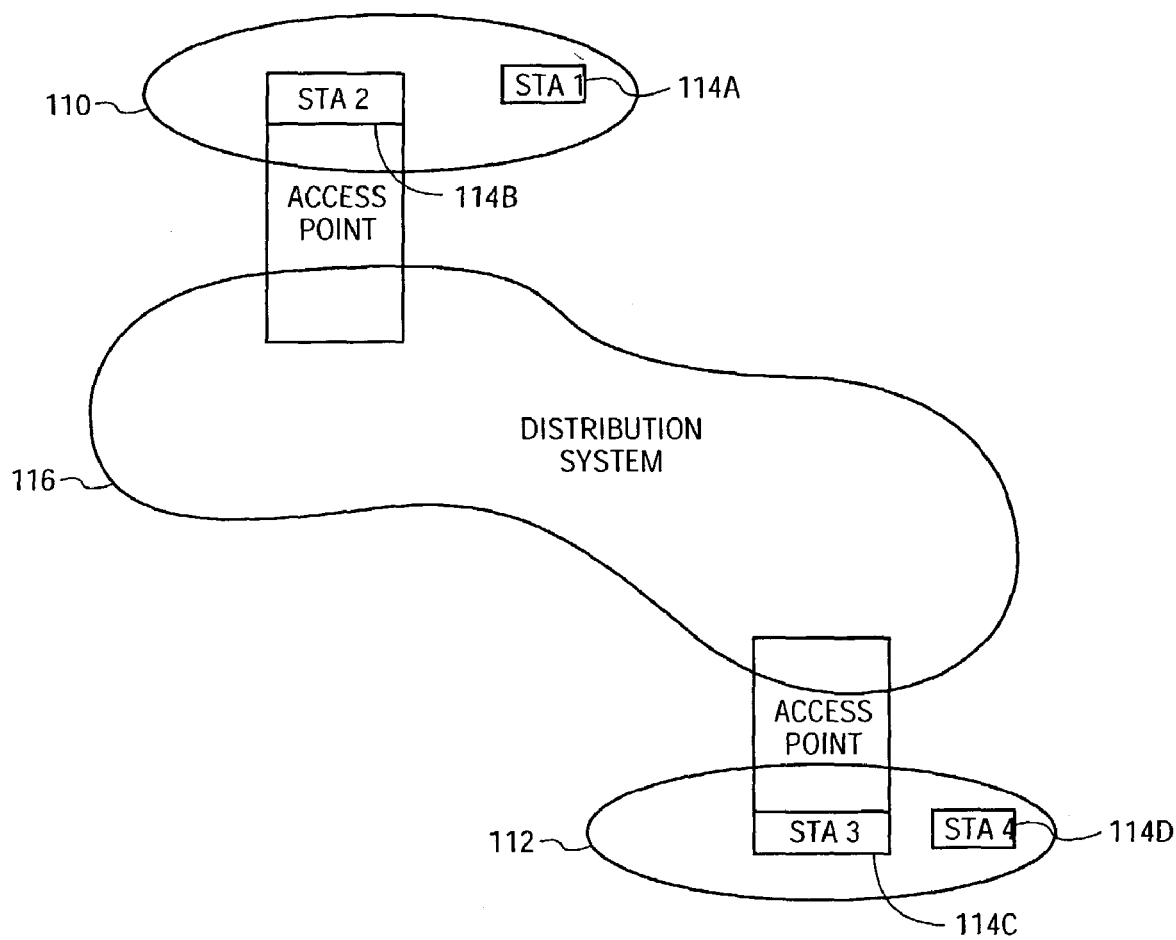
FIG. 1 depicts a block diagram of a wireless network in which the various embodiments of the invention may be used.

Referring now to FIG. 1, what is shown is a block diagram of a wireless network in which the various embodiments of the invention may be used. The network is made of a number of basic service sets (BSSs) 110 and 112 that are coupled to each other through a distribution system (DS) 116. The DS 116 interconnects the BSSs 110, 112 in integrated local area networks, to create an extended service set. An extended service set is a set of one or more interconnected BSSs and integrated local area networks that appear as a single, basic service set to a logical link control layer at any station associated with one of those basic service sets.

Each BSS 110 or 112 includes a set of stations (STAs) 114 that may be controlled by a single coordination function. A coordination function is a logical function that determines when a station 114, operating within a BSS, is permitted to transmit and may be able to receive protocol data units via a wireless medium. According to an embodiment of the invention, each BSS may be analogous to a cell, in a cellular phone system, with the access points playing the same role as a base station.

The BSS 110, 112 communicate with the DS 116 through access points that include the stations 114b and 114c. An access point is any entity that has station functionality and can provide access to a distribution system via a wireless medium, for associated stations. Thus, in this case, stations 114a and 114b are associated with one access point (and can form a WLAN), whereas stations 114d and 114c are associated with another access point (e.g. forming another WLAN). Both of the access points provide access to distribution services of the DS 116. In contrast to nodes that are allowed to roam (e.g. mobile computers or personal digital assistants), the access point may be permanently connected to a wired network infrastructure, in this case the distribution system 116.

The distribution system 116 may be a single backbone network or it may be a wide area network most likely with wide bandwidth/high speed links. In contrast, the wireless links between a station and an access point are typically slower and have less bandwidth and may be shared by all of the stations that connect with the distribution system via the same access point.

The wireless network shown in FIG. 1 may operate in accordance with the IEEE 802.11 protocol, as set forth in IEEE Std. 802.11, 1999 Edition, available from the IEEE Standards Board, Piscataway, N.J. 08855. Other wireless networking protocols may alternatively be used.

Figure 2:
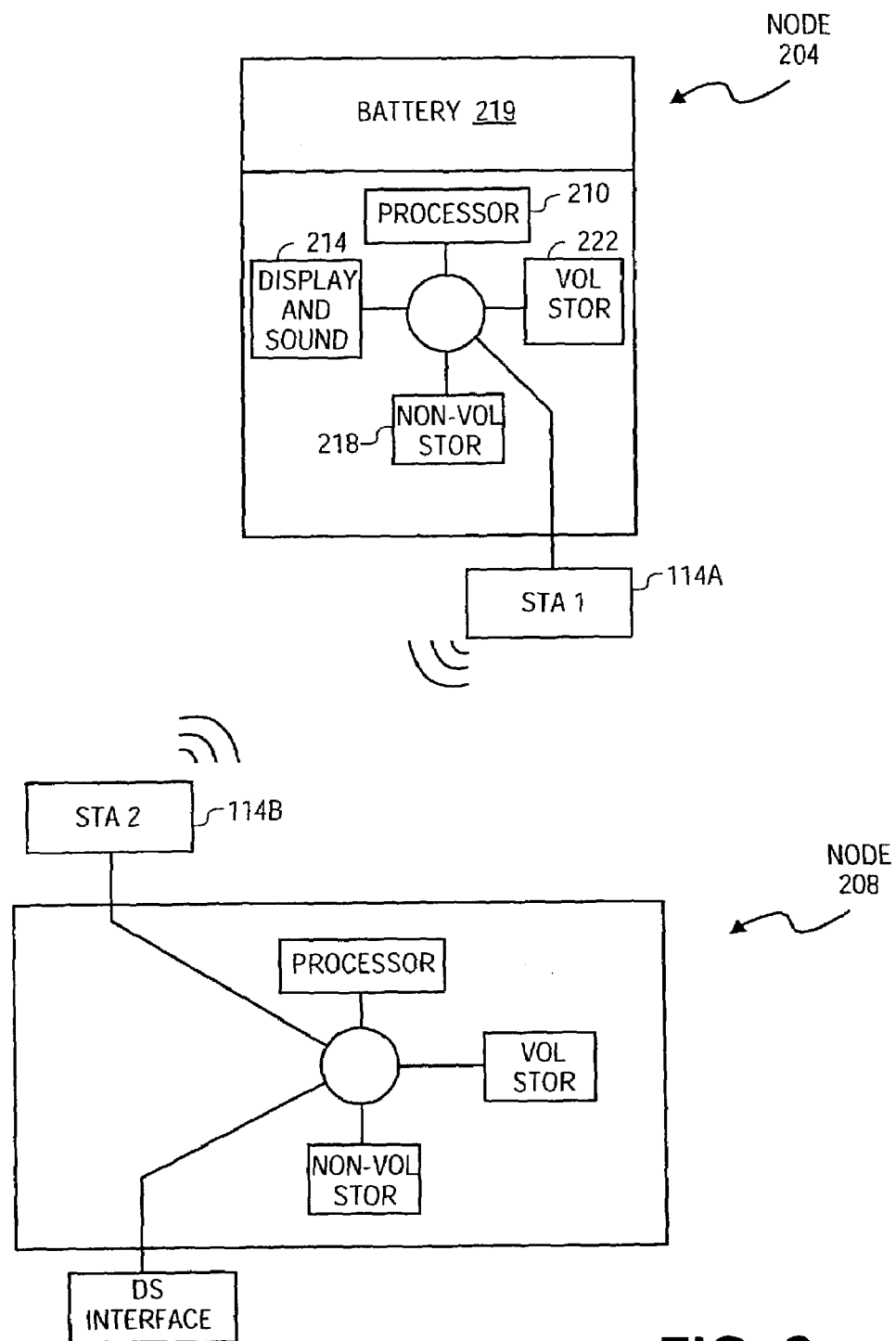
FIG. 2 illustrates a block diagram of two types of processor-based systems, a host and a hub, that communicate with each other as part of a wireless network.

Turning now to FIG. 2, a block diagram of two nodes communicating with each other as part of BSS 110 (see FIG. 1) are shown. In this case, the node 208 is the access point that connects the BSS 110 to the distribution system 116 (see FIG. 1). Each of the nodes 204, 208 is a processor-based system where node 204 may also be referred to as a host. Each node has a processor 210 that executes instructions stored in volatile storage 222 and/or non-volatile storage 218. These instructions may be in the form of various types of programs including operating systems, application programs, and drivers. The node 204 also has the capability of visual and audio input/output, by way of display and sound hardware 214. Volatile storage 222 may be solid state, dynamic random access memory, typically used as program memory. Non-volatile storage 218 may provide mass storage to the node, such as by way of a rotating magnetic disk drive or an optical compact disk drive. Display and sound hardware 214 may comprise a solid state flat panel display and speakers, built into the same enclosure. The node 204 also has a rechargeable battery 219 that powers the various hardware components of the device. As mentioned earlier, the node 204 can be, for example, a mobile computer or a personal digital assistant. Alternatively, the node 204 may be a desktop computer that does not need a battery 219 to run its main functions.

Each station has a physical layer (PHY) interface to a wireless medium. Thus, in the access point (node 208 FIG. 2), station 114b communicates via unguided electromagnetic wave transmissions with station 114a. The station 114a in the particular embodiment of FIG. 2 may be a wireless network interface controller (WNIC) that is plugged into a computer parallel bus (not shown), in either a mobile computer or a desktop computer. In the latter scenario, the WNIC may be a bus adapter while in the former case the WNIC is often a bus card. It will be recognized by those of ordinary skill in the art that the WNIC itself may be a processor-based system, having its own processor and storage configured to execute instructions for carrying out its network communication functions such as establishing a wireless communications link with an access point and the functions described below in connection with ARP proxy.

Communications between a station and an access point, and between hosts, is conducted in accordance with a layered network communications protocol architecture. The PHY layer is one of the lowest layers of the architecture and handles the transmission of raw bits over a communications link. The next higher layer is often referred to as the data link layer, which collects a stream of bits into a larger aggregate sometimes called a frame or packet or protocol data unit. It is these packets that are exchanged among the nodes of a network. Still higher lies the network layer, which handles routing of packets among nodes of different networks. Further up in the architecture is the transport layer which implements process to process channels, where the unit of data exchanged is typically called a message, rather than a packet or a frame. The transport layer and higher layers typically run only on end nodes and not on intermediate nodes (also referred to as switches or routers). In many instances, the access point may also act as such an intermediate node.

Although the layered architecture described above is based on what is called the open systems interconnection (OSI) architecture, other models may alternatively be used to help a system designer better deal with a complex network, by way of different levels of abstraction. A goal here is to provide an abstraction for applications (or processes) that hides the complexity of the network from application writers, where such abstractions naturally lead to layering. Thus, another layered system could be one which starts with the hardware at the lowest layer, followed on top of that by a host to host connectivity layer, and topped with a request/reply channel or message stream channel. The request/reply and message stream channels are examples of process to process channels. Application programs would be located on top of these layers.

Figure 3:
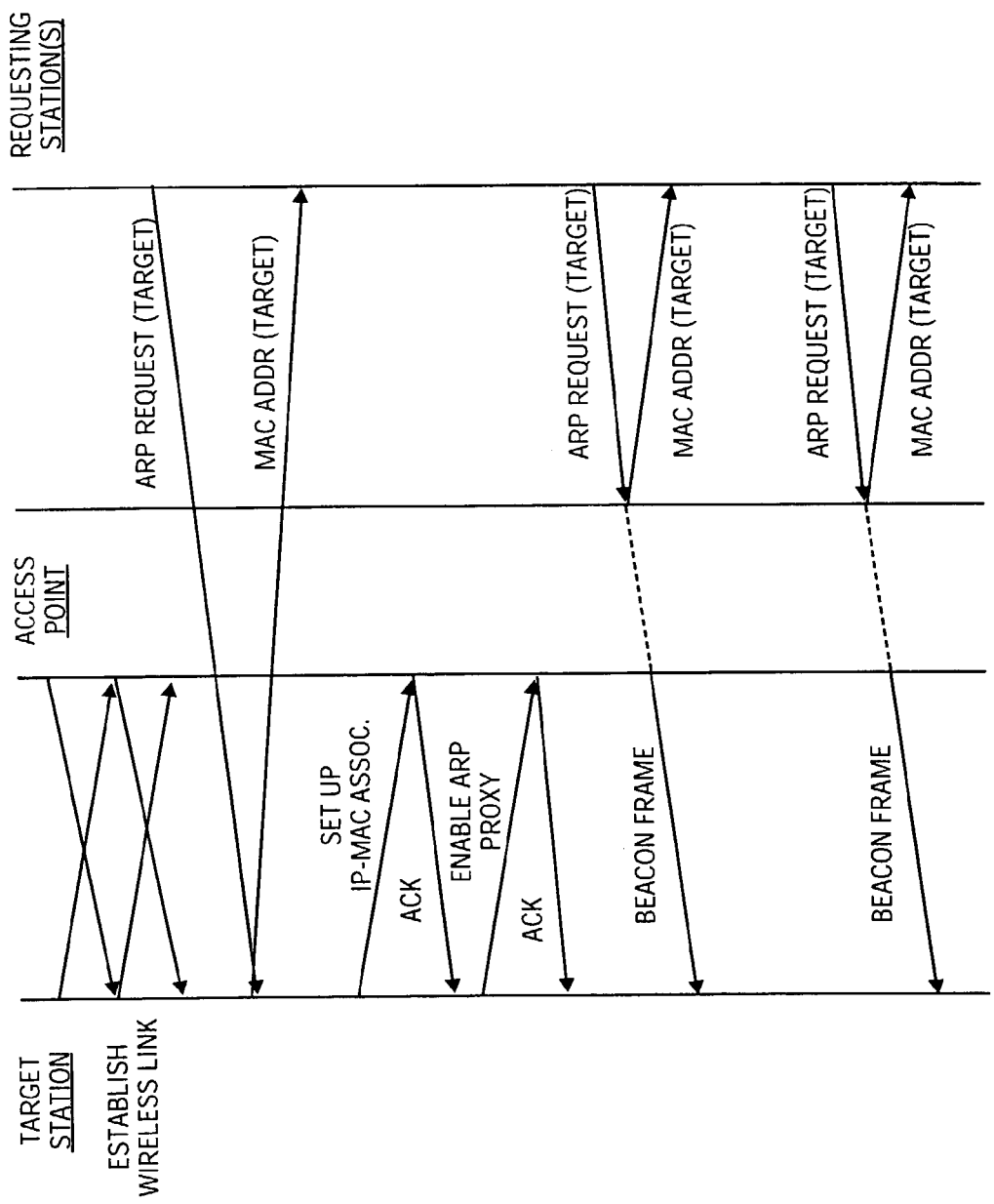
FIG. 3 shows a packet flow diagram of an embodiment of the invention.

Turning now to FIG. 3, what is shown is a packet flow diagram of communications between a requesting station, an access point, and a target station, according to an embodiment of the invention. Note that the requesting station need not be in the same WLAN as the access point and the target station. The target station is referred to in that way because, under conventional techniques, it will be the station that ultimately responds to a request for resolving a target upper layer network communications protocol address (that was sent by the requesting station). In the example of FIG. 3, the lower layer address is a media access control (MAC) address, and the upper layer address is an internet protocol (IP) address.

Operation may begin with a wireless link being established between the target station and the access point, using conventional transactions such as those defined for establishing a link to an end node of a WLAN. A transaction may comprise a request packet followed by an acknowledge (ack) packet sent in response thereto. Where the station is a processor-based system itself, or is connected to a bus of a host processor-based system, the wireless link can be orchestrated by the processor executing data stored in a machine-readable medium (e.g. non-volatile or volatile storage). The links may be established for multiple stations that are associated with the access point. Once the link has been established, the target station can send and receive packets via the access point, and its host appears as a node in a network.

In a conventional wireless network, a broadcast ARP request that is received by the access point is re-broadcast in the wireless network, arriving at the target station (as well as any other stations that established links with and are associated with the access point). Since the target IP address specified in the request matches that of the target station, the target station responds with its MAC address.

According to an embodiment of the invention, the access point is designed to store both the IP and MAC addresses of a target station. The target station may send a set-up notification for such an association, as part of a transaction with the access point, as shown in FIG. 3. The set-up notification contains the IP address of the target station. The access point then acknowledges the set-up notification and stores the received IP address, in association with the MAC address of the target station. (The MAC address was previously stored in the access point.) Thereafter, the target station can send an enable notification to the access point, labeled Enable ARP Proxy in FIG. 3, which actually enables the access point to proxy ARP requests directed to the target station. The enable notification can alternatively be combined into the set-up notification, in one frame. Once the ARP proxy has been enabled, subsequent ARP requests received by the access point and that specify the target IP address are "proxied" the access point who responds with the MAC address of the target station. According to an embodiment of the invention, this is done without re-broadcasting the ARP request into the wireless network of the access point. In this manner, the target station does not receive, process, and transmit a response to the ARP request, thereby conserving energy.

If there are a large number of stations associated with the access point as part of a WLAN, then the likelihood of ARP requests being received in the WLAN increases. Accordingly, greater energy savings can be obtained if the above-described technique is applied to enable the access point to proxy ARP requests for as many of its associated stations as possible.

The set-up notification described above may be an IEEE 802.11 Generic Management Action Frame that contains the target station's assigned or configured IP address. An example of the packet format is shown below. Note the following abbreviations: Short Inter Frame Space, SIFS; receiver address, RA; transmitter address, TA; basic service set identification, BSSID; and frame check sequence. FCS.

| Octet Number | Field | Description |
| --- | --- | --- |
| 0-1 | Frame Control | Type (management) subtype (action |
| 2-3 | Duration/ID | Duration = Ack + SIFS time |
| 4-9 | Address 1 | RA |
| 10-15 | Address 2 | TA |
| 16-21 | Address 3 | BSSID |
| 22-23 | Sequence Control | Sequence number/fragment number |
| 24 | Category | ARP Proxy code to be assigned |
| 25 | Action | ARP Proxy action code (see table) |
| 26 | reserved | Zero |
| 27 | reserved | Zero |

-continued

| Octet Number | Field | Description |
| --- | --- | --- |
| 28-(n − 5) | ARP Proxy data | ARP Proxy action specific data |
| (n − 4)-(n − 1) | FCS | CRC |

The frames can be assigned a unique ARP proxy category code. Request actions may use even numbered action codes, while response actions use odd numbered codes. For a request action code N, the corresponding response action code, if there is such a response, would be N+1. An example of action request and response codes for the ARP proxy technique described above is as follows:

| Code | ARP Proxy Action |
| --- | --- |
| 11 | Set IP Address Request |
| 12 | Set IP Address Response |

The IP address length and the IP address of the target station would be placed in the ARP Proxy data field shown in the packet format above.

Once the above-described notification and enabling of ARP proxy by the access point has occurred, the target station may enter a low power consumption mode. This may be initiated manually (e.g. by a user selecting sleep mode in the host), or automatically (e.g. via a power management routine being executed by the station itself or by the host). By proxying ARP requests as described above, the target station is not disturbed from its low power mode, thereby helping conserve energy.

It should be noted that the networked access point and target station can be designed to communicate with each other in different ways, so as to achieve the desirable effect of not disturbing the target station with proxied ARP requests. For instance, 802.11 networks operate as follows. The way in which each station (or node) receives incoming packets is that the access point sends out a beacon frame that includes a directed target indication map (DTIM) or target indication map (TIM). The DTIM contains bits, each of which is uniquely associated with one of the associated nodes and will be set whenever there is a packet waiting for that particular node. The node subsequently transmits a request to have the access point send the packet. The DTIM and TIM also have bits that indicate to all of the associated nodes that there is a broadcast packet being buffered by the access point. So, in such an embodiment, a node that wishes to conserve power, by having the access point proxy any ARP requests, ignores the broadcast bits and never requests that the access point send the broadcast packet. This embodiment is depicted in FIG. 3 in which the access point sends out beacon frames (that are received by associated stations) indicating a broadcast packet is ready, and to which the associated, target station does not respond, because it has previously requested the access point to proxy the broadcast ARP requests.

According to an embodiment of the invention, the associated nodes do not have knowledge of what is contained in the broadcast packet. Those nodes that know that the access point is enabled for ARP proxying will choose to ignore the broadcast bit, assuming it refers to an ARP request that will be handled by the access point. Nodes that do not know how to have the access point perform ARP proxy will transmit what is referred to as a PS_Poll message to the access point, and then use power to receive the packet(s). These nodes will then need to transmit an ARP response to the access point, if they desire to remain reachable by their IP address.

To summarize, various embodiments of a method and apparatus for reducing power consumption in a wireless network station have been described. In the foregoing specification, the invention has been described with reference to specific exemplary embodiments thereof. It will, however, be evident that various modifications and changes may be made thereto without departing from the broader spirit and scope of the invention as set forth in the appended claims. For example, although ARP is a current protocol used for obtaining a lower layer address of a target station whose upper layer address is known, the proxy technique described above can also be applied to future address resolution protocols, to achieve the advantage of reduced power consumption in the target station. The specification and drawings are, accordingly, to be regarded in an illustrative rather than a restrictive sense.

What is claimed is:

1. A method for network communications, comprising:
   storing, in an access point, an internet protocol (IP) address of a wireless network station and a media access control (MAC) address of the wireless network station; and
   proxying, by the access point, a received, broadcast address resolution protocol (ARP) request that contains said IP address as a target IP address, by responding to the ARP request with said MAC address without re-broadcasting the ARP request into a wireless network of the access point.

2. The method of claim 1 further comprising receiving said IP address in a notification from the station, wherein the notification associates the IP address of the station with the MAC address and instructs the access point to proxy all broadcast ARP requests that have the target IP address.

3. The method of claim 2 further comprising causing a beacon frame to be transmitted in response to receiving the ARP request, the beacon frame including a target indication map that indicates a broadcast packet is being buffered.

4. A method for network communications, comprising:
   establishing a local area network wireless communications link between a host and an access point; and
   transmitting by the host and via said link, in response to a decision made in the host to enter low power consumption mode, a notification to the access point, wherein the notification includes an indication to enable proxying by the access point of received broadcast requests that seek to resolve an upper layer network communications protocol address of the host into an associated lower layer address, so that the access point responds to the requests without re-broadcasting the requests into its wireless local area network.

5. The method of claim 4 further comprising after transmitting said notification, receiving by the host a frame from the access point indicating that a broadcast packcet is being buffered by the access point for the host, and in response ignoring said indication of the broadcast packet so that the host remains in said low power consumption mode.

6. The method of claim 4 wherein the upper layer address is an internet protocol address of the host, and both the upper layer address of the host and the indication to enable proxying are transmitted by the host to the access point in a single frame.

7. A system for network communications, comprising:
   an access point comprising a processor coupled to a storage containing data which, when accessed by the processor, cause a stored, lower layer network communications address associated with a target wireless network station to be transmitted a) in reply to a broadcast query for a lower layer network communications protocol address associated with a target upper layer network communications protocol address which is specified by the query and that is associated with the target station, without causing the access point to rebroadcast the query to the target station, and b) in response to a message from the target station that said reply be enabled.

8. The system of claim 7 wherein the stored, lower layer network communications protocol address is a media access control address of the target station, and the storage contains further data which, when accessed by the processor, configure a beacon frame that indicates said query is being buffered for said associated target station.

9. The system of claim 8 wherein the upper layer network communications protocol address is an internet protocol address of the target station.

10. The system of claim 9 wherein the query is an address resolution protocol (ARP) request.

11. The system of claim 7 wherein the upper layer network communications protocol address is an internet protocol address of the target station.

12. The system of claim 7 wherein the storage contains further data which, when accessed by the processor, cause a set of stations, including said target station, to be controlled by a single coordination function that determines when any one of said set of stations is permitted to transmit and receive protocol data units via a wireless medium.

13. An article of manufacture comprising:
   a machine-readable medium having data stored thereon which, when executed by a processor, cause a wireless access point to reply to a received, broadcast request for resolving an upper layer network communications protocol address of a target station, by sending a lower layer network communications protocol address stored in the access point and that is associated with the target station, without rebroadcasting the request to the target station, based on the access point having received a set-up message from the target station prior to receiving said broadcast request and the set-up message indicates that said reply be enabled.

14. The article of manufacture of claim 13 wherein the upper layer network communications protocol is internet protocol.

15. The article of manufacture of claim 13 wherein the machine-readable medium has further data stored thereon which, when executed by the processors, cause wireless local area network links to be established with the target station and with the access point, and cause the access point to send a beacon frame that indicates the access point is buffering a request which is directed to the target station.

16. A system for network communications, comprising:
   an access point associated with a wireless local area network (WLAN); and
   a battery-powered station to establish a wireless communications link with the access point as part of said WLAN,
   wherein the access point is to obtain an upper layer network communications protocol address and a lower layer network communications protocol address of the station, and proxy a broadcast request from a source node to resolve an upper layer network communica tions protocol address that matches that of the station, by replying to the broadcast request with said lower layer network communications protocol address without re-broadcasting the request to said WLAN, wherein the station is to notify the access point to enable said proxying by the access point.

17. The system of claim 16 wherein the access point is designed to operate according to an upper layer network communications protocol being internet protocol.

18. The system of claim 17 wherein the station is to, after having notified the access point, not request the access point to forward any broadcast packets that concern the station.

19. The system of claim 17 wherein the station is to, after having notified the access point, not reply to any beacon frames from the access point.

* * * * *

UNITED STATES PATENT AND TRADEMARK OFFICE
CERTIFICATE OF CORRECTION

PATENT NO. : 7,289,518 B2
APPLICATION NO. : 10/323111
DATED : October 30, 2007
INVENTOR(S) : Huckins Page 1 of 1

It is certified that error appears in the above-identified patent and that said Letters Patent is hereby corrected as shown below:

In column 5, at line 32, after "proxyed" insert --by--.

In column 5, at line 53, delete "sequence." and insert --sequence,--.

In column 8, at line 52, delete "processors" and insert --processor--.

Signed and Sealed this

Fifteenth Day of April, 2008

JON W. DUDAS
*Director of the United States Patent and Trademark Office*